United States Patent
Utagawa

(10) Patent No.: US 7,894,479 B2
(45) Date of Patent: Feb. 22, 2011

(54) DATA PROCESSING SYSTEM, TRANSMISSION APPARATUS, AND BAND CONTROL APPARATUS

(75) Inventor: Yuka Utagawa, Kamakura (JP)

(73) Assignee: Canon Kabushiki Kaisha, Tokyo (JP)

( * ) Notice: Subject to any disclaimer, the term of this patent is extended or adjusted under 35 U.S.C. 154(b) by 211 days.

(21) Appl. No.: 12/191,090

(22) Filed: Aug. 13, 2008

(65) Prior Publication Data

US 2009/0046737 A1  Feb. 19, 2009

(30) Foreign Application Priority Data

Aug. 14, 2007  (JP)  ............................. 2007-211455

(51) Int. Cl.
*H04J 3/16*  (2006.01)
(52) U.S. Cl. ..................................... 370/468
(58) Field of Classification Search ................ 370/252, 370/389, 395.52, 468, 477
See application file for complete search history.

(56) References Cited

U.S. PATENT DOCUMENTS 5,848,266 A * 12/1998 Scheurich ................... 713/503
2004/0174889 A1 * 9/2004 Kikuchi et al. ............... 370/401
2007/0280128 A1 * 12/2007 Okano ........................ 370/252

FOREIGN PATENT DOCUMENTS

JP  11-98152  4/1999

OTHER PUBLICATIONS

Resource ReSerVation Protocol (RSVP)—Version 1 Functional Specification, Sep. 1997, 112 pages, R. Braden, Ed.,L. Zhang, S. Berson, S. Herzog, S. Jamin.

* cited by examiner

*Primary Examiner*—Frank Duong
(74) *Attorney, Agent, or Firm*—Canon USA Inc IP Division

(57) ABSTRACT

A data processing system that packetizes content, transmits the packetized content via a transmission path, and allocates a transmission path band for transmitting the packetized content includes a packet interval control unit configured to control intervals at which packets of the packetized content are transmitted, an obtaining unit configured to obtain communication information indicating a communication state in which the intervals at which the packets are transmitted; a band computation unit configured to compute a transmission path band for transmitting the packetized content based on the communication information obtained by the obtaining unit, and a band allocation unit configured to allocate the transmission path band computed by the band computation unit within the transmission path.

14 Claims, 8 Drawing Sheets

DATA PROCESSING SYSTEM, TRANSMISSION APPARATUS, AND BAND CONTROL APPARATUS

BACKGROUND OF THE INVENTION

1. Field of the Invention

The present invention relates to a data processing system and method, a transmission apparatus and method for controlling the transmission apparatus, and a band control apparatus and method for controlling the band control apparatus. More particularly, the present invention relates to a technology suitably used to allocate an optimum transmission path band.

2. Description of the Related Art

In an information communication network, such as the Internet, information is divided into units called packets and is transmitted processing of packets in a network, basically, a processing method operating on a first-come, first-served basis, which is called a best effort method, is performed to transmit the packets. However, in such a processing method, since all packets are handled equally, a sufficient transmission path band cannot be guaranteed for multi-media traffic necessitating real-time transmission of data, such as audio and images. For this reason, a fixed quality cannot be guaranteed, for example, precise reproduction is not possible in real time on the reception side.

In comparison, in Internet Engineering Task Force (IETF), a resource reservation protocol, such as Resource ReSerVation Protocol (RSVP), is defined as an Internet standard.

Use of RSVP enables a transmission path band necessary for each stream to be allocated before communication is started, and thereby communication in which a fixed quality is guaranteed can be performed.

However, hitherto, when a band reservation function, such as RSVP, has been used from an application (application program), a function of requesting a band reservation has been incorporated for each application. Then, by using only the band needed by an application as a single parameter, a band reservation request for only that band is made to the network.

For this reason, external factors, such as a communication request for each user and currently usable bands of the network, are not taken into account. Therefore, regarding band reservation regulation, optimization in which these parameters are evaluated comprehensively has not been sufficiently performed.

An example of a wireless standard is IEEE 802.11e. Based on IEEE 802.11a and IEEE 802.11b, which are known standards, IEEE 802.11e has been established as a standard used when performing expansion regarding QoS and security. A dynamic TDMA method has been adopted for access control. The TDMA method is a method in which a transmission path band is shared on a time-division basis, whereas the dynamic TDMA method is a method in which terminals exchange control information with each other, the priority is determined according to the type of data to be transmitted, and efficient data transmission is made possible. In streaming of audio and moving images, since a fixed transmission path band is allocated, interruption of data transmission does not occur, and smooth reproduction is guaranteed.

Furthermore, for example, in Japanese Patent Laid-Open No. 11-98152, resources of the network are reserved for an optimum communication band calculated based on the band desired by a user and the network bands that can be used at that time. Then, a technology for starting the transmission and reception of the stream of a communication application is disclosed. As a result, it is possible to guarantee as a minimum quality of communication that can be used at that time.

However, in the related art, the transmission path band specified by the user is not determined based on the actual streaming data. For this reason, in some cases, the transmission path band specified by the user may be increased more than is necessary, and there is a possibility that the use efficiency of the line is decreased.

SUMMARY OF THE INVENTION

The present invention provides a data processing system in which an optimum transmission path band is allocated and the use efficiency of a line is improved.

According to one aspect of the present invention, a data processing system that packetizes content, transmits the packetized content, and allocates a transmission path band for transmitting the packetized content, includes a packet interval control unit configured to control intervals at which packets of the packetized content are transmitted, an obtaining unit configured to obtain communication information indicating a communication state in which the intervals at which the packets are transmitted, a band computation unit configured to compute a transmission path band for transmitting the packetized content based on the communication information obtained by the obtaining unit, and a band allocation unit configured to allocate the computed transmission path band within a transmission path.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

First Embodiment

An exemplary embodiment of the present invention will be described below with reference to the drawings.

Figure 1:
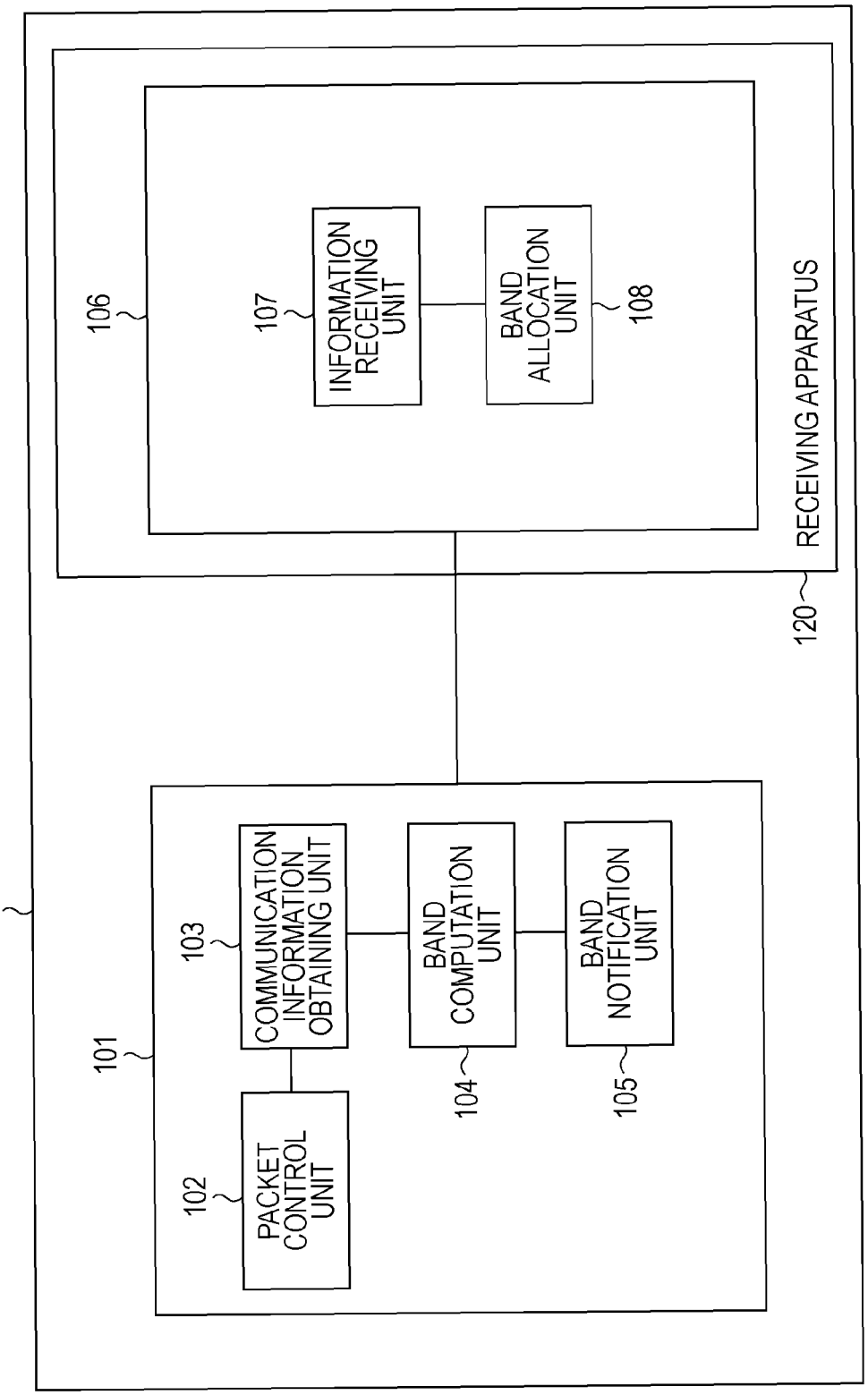
FIG. 1 is a block diagram showing an example of functions of a data processing system according to a first embodiment of the present invention.

FIG. 1 is a block diagram showing an example of functions of a data processing system according to the present embodiment.

As shown in FIG. 1, a data processing system 109 includes a transmission apparatus 101 and a band control apparatus 106. The transmission apparatus 101 includes a packet control unit 102, a communication information obtaining unit 103, a band computation unit 104, and a band notification unit 105. Furthermore, the band control apparatus 106 includes an information receiving unit 107 and a band allocation unit 108. Furthermore, the band control apparatus 106 is formed as a part of a receiving apparatus 120 for requesting and receiving content. In the present embodiment, an optimum transmission path band for when data is streamed from the transmission apparatus 101 to the band control apparatus 106 is computed.

Figure 2:
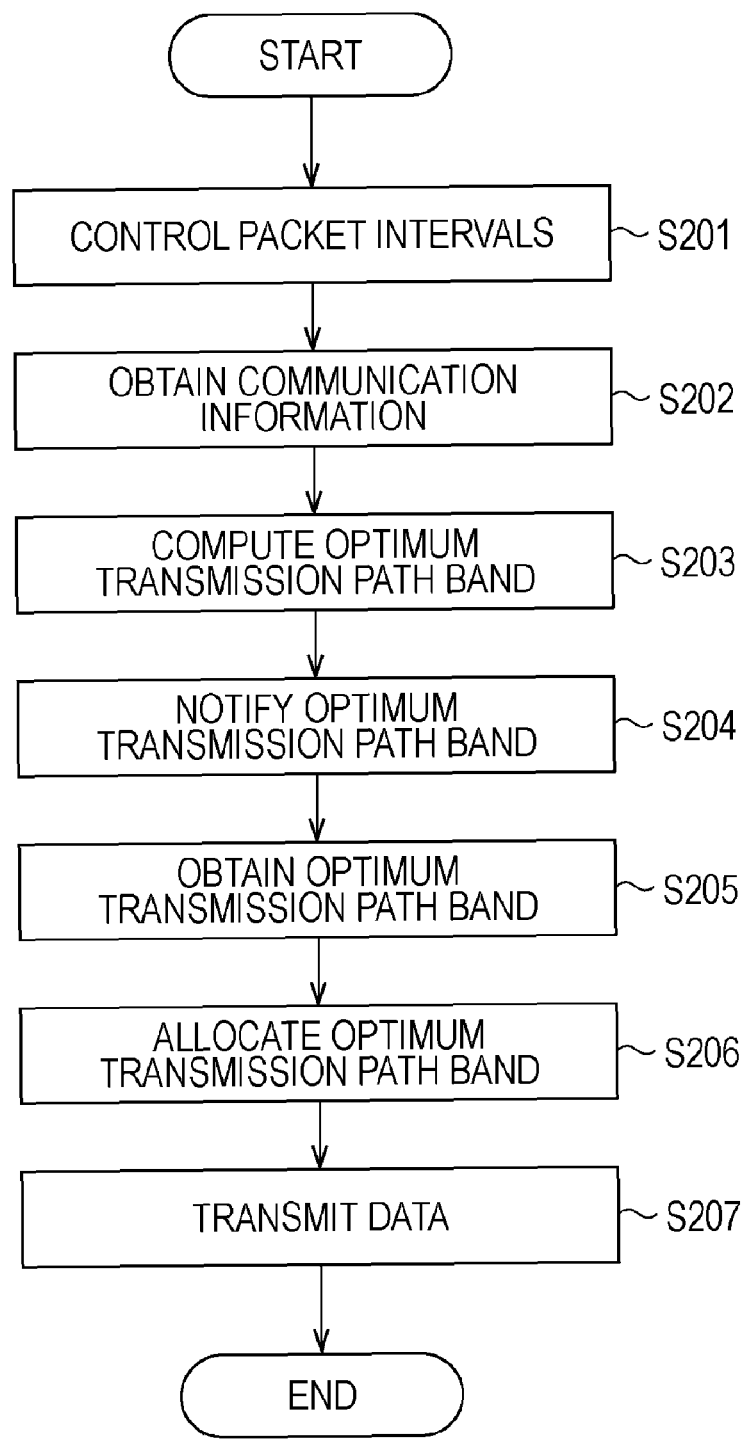
FIG. 2 is a flowchart showing an example of a processing procedure for allocating an optimum transmission path band in the data processing system according to the first embodiment of the present invention.

FIG. 2 is a flowchart showing an example of a processing procedure for allocating an optimum transmission path band in the data processing system 109 of the present embodiment.

Upon receipt of a request for content from the receiving apparatus 120, processing is started. Initially, the packet control unit 102 of the transmission apparatus 101 functions as a packet interval control unit, and performs control so that packet intervals of data to be streamed are adjusted (step S201). Here, the adjustment of packet intervals is processing in which, as shown in FIG. 3 or 4, data is transmitted at equal packet intervals so that burst traffic does not occur, and thereby the network is efficiently used to realize stabilized communication.

Next, the communication information obtaining unit 103 obtains information on a packet interval control method performed by the packet control unit 102 and communication information indicating other communication states (step S202). Examples of communication information other than the packet interval control method include, but are not limited to, a transmission rate and an error rate. Then, the band computation unit 104 computes an optimum transmission path band on the basis of the communication information (step S203).

Here, referring to FIGS. 3 and 4, a method of computing communication information and an optimum transmission path band in accordance with a packet interval control method will be described.

Figure 3:
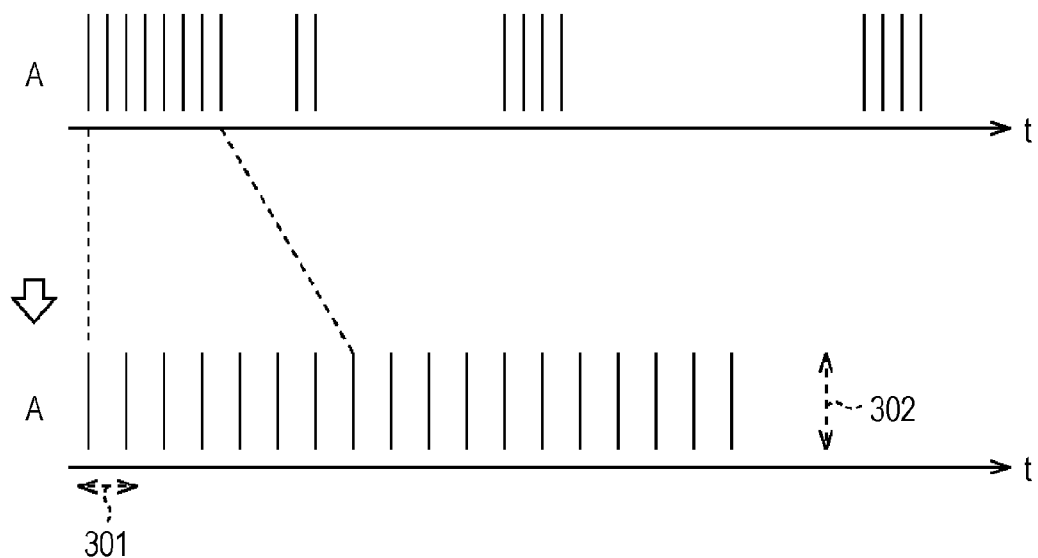
FIG. 3 shows an example of control of packet intervals according to the first embodiment of the present invention.
Figure 4:
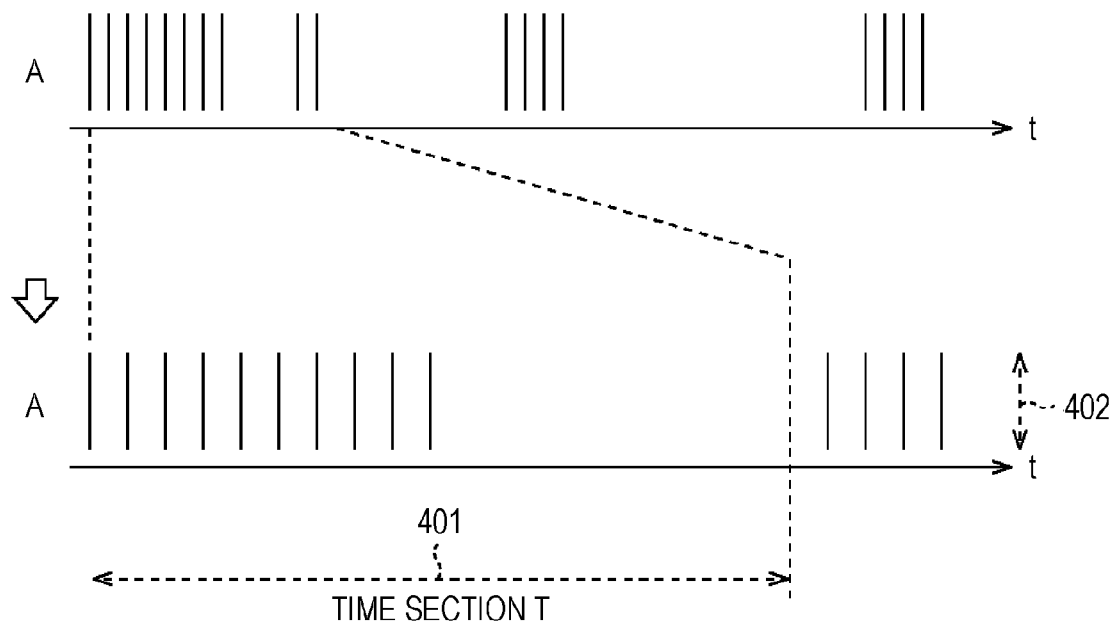
FIG. 4 shows an example of control of packet intervals according to the first embodiment of the present invention.

As shown in FIG. 3, when all the packetized packets are controlled at equal intervals, it is possible to compute an optimum transmission path band to be allocated by using a packet interval 301, a packet size 302, and a time period required to send all the packets as communication information.

FIG. 4 shows packet intervals in a case where packet intervals are controlled in units of frames. In this case, a time section 401 indicating a period, a maximum packet size 402 in that section 401, a packet interval, and a time period required to send all the packets are used as communication information. As a result, it is possible to allocate a band through which all the packets can be sent in an amount of time corresponding to a necessary time.

The band computation unit 104 is able to obtain information on all the frames contained in data, and needs to select information with which data can be transmitted most efficiently from among the plurality of items of information. Accordingly, a priority is set in advance in each of the items constituting the communication information.

For example, when control of packet intervals is performed in units of frames, the amount of code differs among I frames, P frames, and B frames. If information on an I frame can be obtained, communication information on an I frame, which has an increased amount of code within a frame, is used as a maximum instantaneous band information to compute an optimum transmission path band. By setting the priority of the communication information on an I frame as described above, it is possible to more reliably transmit the P frame and B frame. In the present embodiment, a priority is set by using the amount of code of a frame as an example, but the priority setting method is not limited to this example.

Based on the communication information obtained in the manner described above, the band computation unit 104 of the transmission apparatus 101 computes an optimum transmission path band through which all the packets can be sent when data is to be transmitted. Then, the band notification unit 105 notifies the band control apparatus 106 of the information on the optimum transmission path band (step S204).

As described above, as communication information used to compute an optimum transmission path band, an interval at which packets during packet interval control are sent, a packet size, and a time required to send all the packets are used. As a result, the band control apparatus 106 receiving information on the optimum transmission path band is able to determine how much of the band should be allocated at what times.

Furthermore, the band notification unit 105 of the transmission apparatus 101 has a function of simultaneously notifying the band control apparatus 106 of the information on the optimum transmission path band and communication information. When an optimum transmission path band is to be computed by the transmission apparatus 101, there are cases in which the band control apparatus 106 needs information on how long the specified band should be allocated. In this case, when the band control apparatus 106 is to be notified of the information on the computed optimum transmission path band by the transmission apparatus 101, communication information other than information on a band, such as total packet sending time, is also notified at the same time.

As described above, the information receiving unit 107 of the band control apparatus 106 functions as a band receiving unit, and obtains information on an optimum transmission path band (step S205). Next, the band allocation unit 108 allocates the specified band and ensures an area therefor (step S206). Then, after the band is allocated, the transmission apparatus 101 transmits the data (packets) whose packet intervals are controlled to the receiving apparatus 120 (step S207), and then the processing is completed.

As described above, in the present embodiment, when transmitting stream data, communication information, such as information on the control of packet intervals, is obtained on the transmission apparatus side, and furthermore, an optimum transmission path band is computed based on the communication information. As a result, it is possible to allocate an optimum band appropriate for streaming data and a communication state and it is possible to improve the use efficiency of a line.

Second Embodiment

A second embodiment of the present invention will be described below with reference to FIG. 5. In the first embodiment, the transmission side has a function of obtaining communication information and computing an optimum transmission path band based on the communication information. In the present embodiment, a description will be provided of an example in which, in comparison to the previous embodiment, the reception side (the band control apparatus side) has a function of computing an optimum transmission path band.

Figure 5:
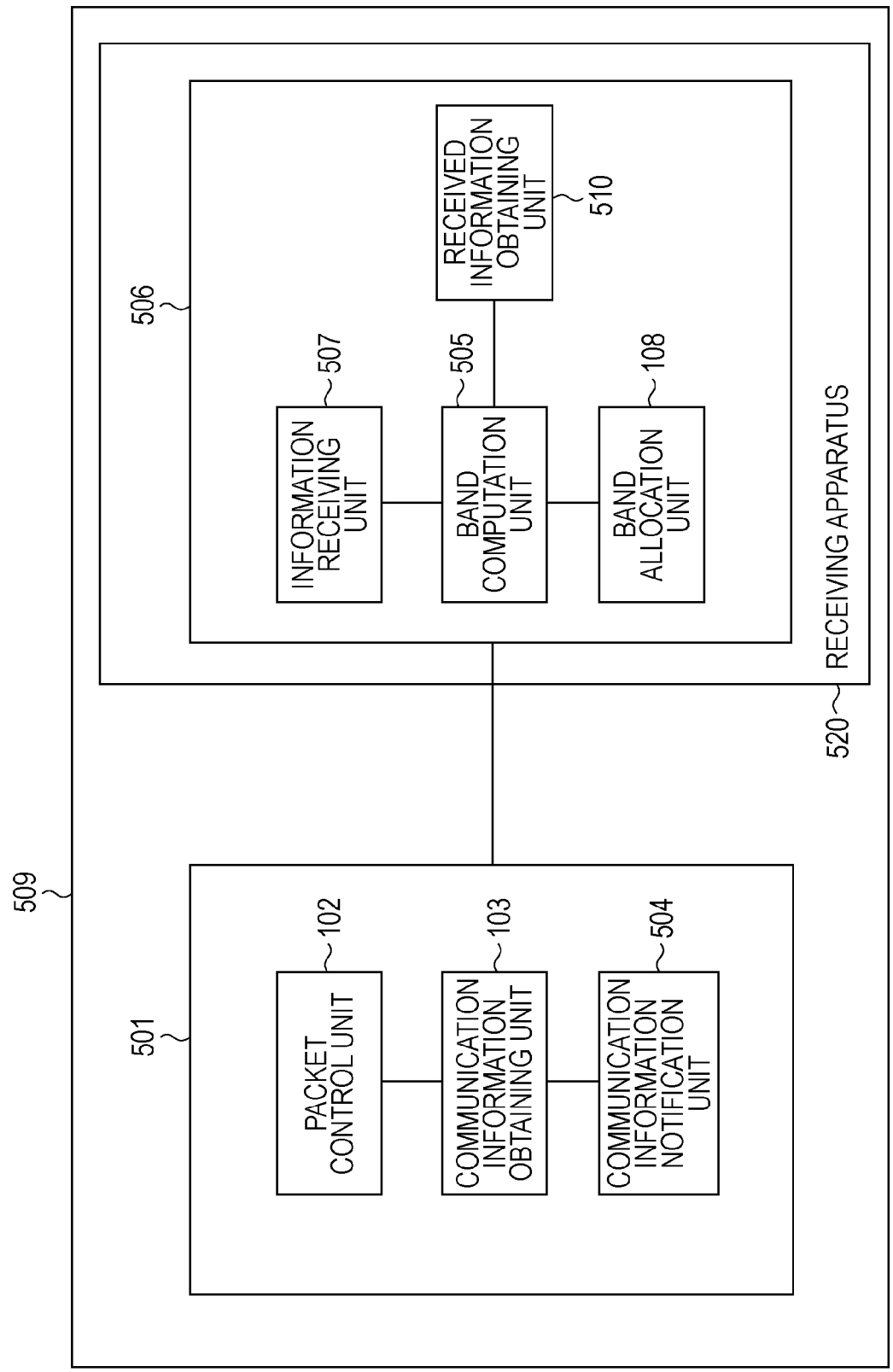
FIG. 5 is a block diagram showing an example of functions of a data processing system according to a second embodiment of the present invention.

FIG. 5 is a block diagram showing an example of functions of a data processing system in the present embodiment.

As shown in FIG. 5, a data processing system 509 includes a transmission apparatus 501 and a band control apparatus 506. The transmission apparatus 501 includes a packet control unit 102, a communication information obtaining unit 103, and a communication information notification unit 504. The band control apparatus 506 includes an information receiving unit 507, a band computation unit 505, a band allocation unit 108, and a received information obtaining unit 510. Furthermore, the band control apparatus 506 is configured as a part of a receiving apparatus 520 for requesting and receiving content. The packet control unit 102, the communication state obtaining unit 103, and the band allocation unit 108, have the same functions as those of the first embodiment described with reference to FIG. 1, and accordingly, detailed descriptions thereof are omitted herein.

Figure 9:
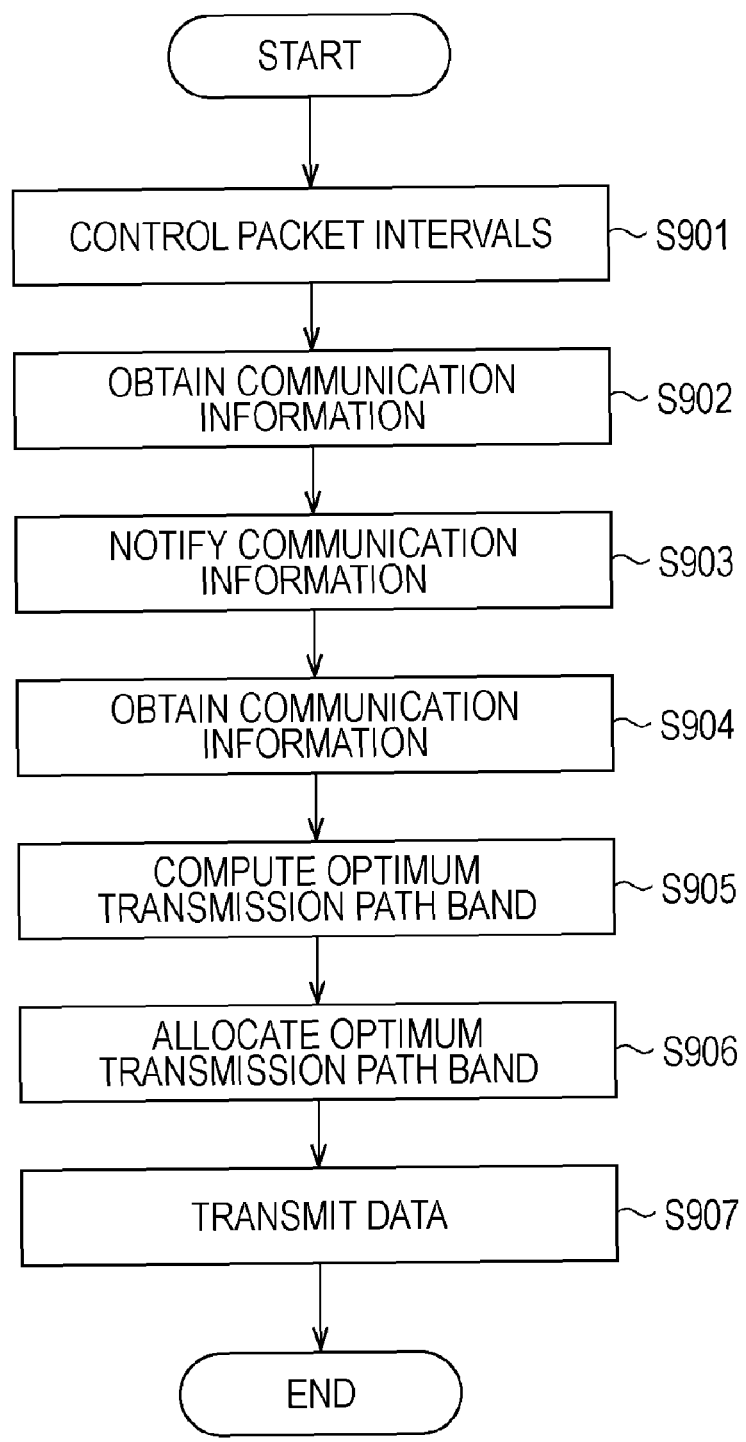
FIG. 9 is a flowchart showing an example of a processing procedure for allocating an optimum transmission path band in the data processing system in the second embodiment of the present invention.

FIG. 9 is a flowchart showing an example of a processing procedure for allocating an optimum transmission path band in the data processing system 509 of the present embodiment.

When a request for content is obtained from the receiving apparatus 120, processing is started. Initially, the packet control unit 102 performs control of packet intervals (step S901). Then, the communication information obtaining unit 103 obtains, as communication information, information on the control of packet intervals and information during transmission, such as a transmission rate (step S902). Next, the communication information notification unit 504 notifies the band control apparatus 506 of the obtained communication information (step S903).

As a result, the information receiving unit 507 of the band control apparatus 506 obtains the communication information from the transmission apparatus 101 (step S904). Next, the band computation unit 505 of the band control apparatus 506 computes an optimum transmission path band based on the communication information (step S905). The communication information used to compute the optimum transmission path band is the same as that shown in the first embodiment. Then, the band allocation unit 108 allocates the optimum transmission path band computed by the band computation unit 505 and ensures an area thereof (step S906). After the optimum transmission path band computed in the manner described above is allocated, the transmission apparatus 501 transmits data (packets) whose packet intervals are controlled to the receiving apparatus 520 (step S907), and the processing is then completed.

In the present embodiment, an example in which communication information is obtained from the transmission apparatus 501 has been described. The band control apparatus 506 includes a received information obtaining unit 510 having a function of obtaining received information on a communication state during reception, such as a reception rate. Accordingly, it is also possible to compute the optimum transmission path band by taking the received information obtained by the received information obtaining unit 510 into consideration. For example, in the case that there are variations in the reception rate and a packet loss is expected to occur depending on the state by only allocating the specified optimum transmission path band, it is possible for the band control apparatus 506 to determine the optimum transmission path band on the basis of the variations in the reception rate. As a result, it is possible to suppress a packet loss that might occur with only the communication information obtained from the transmission apparatus 501 side.

As described above, in the present embodiment, in the band control apparatus 506, an optimum transmission path band is computed by taking the received information into consideration in addition to the communication information notified by the transmission apparatus 501. As a result, it is possible to allocate an optimum transmission path band appropriate for the communication state of the reception side, making it possible to decrease a packet loss ratio during streaming distribution.

Third Embodiment

In the first and second embodiments, an example in which a file that has already been stored is transmitted has been described. In the present embodiment, a process regarding streaming of content in real time will be described with reference to FIG. 6.

Figure 6:
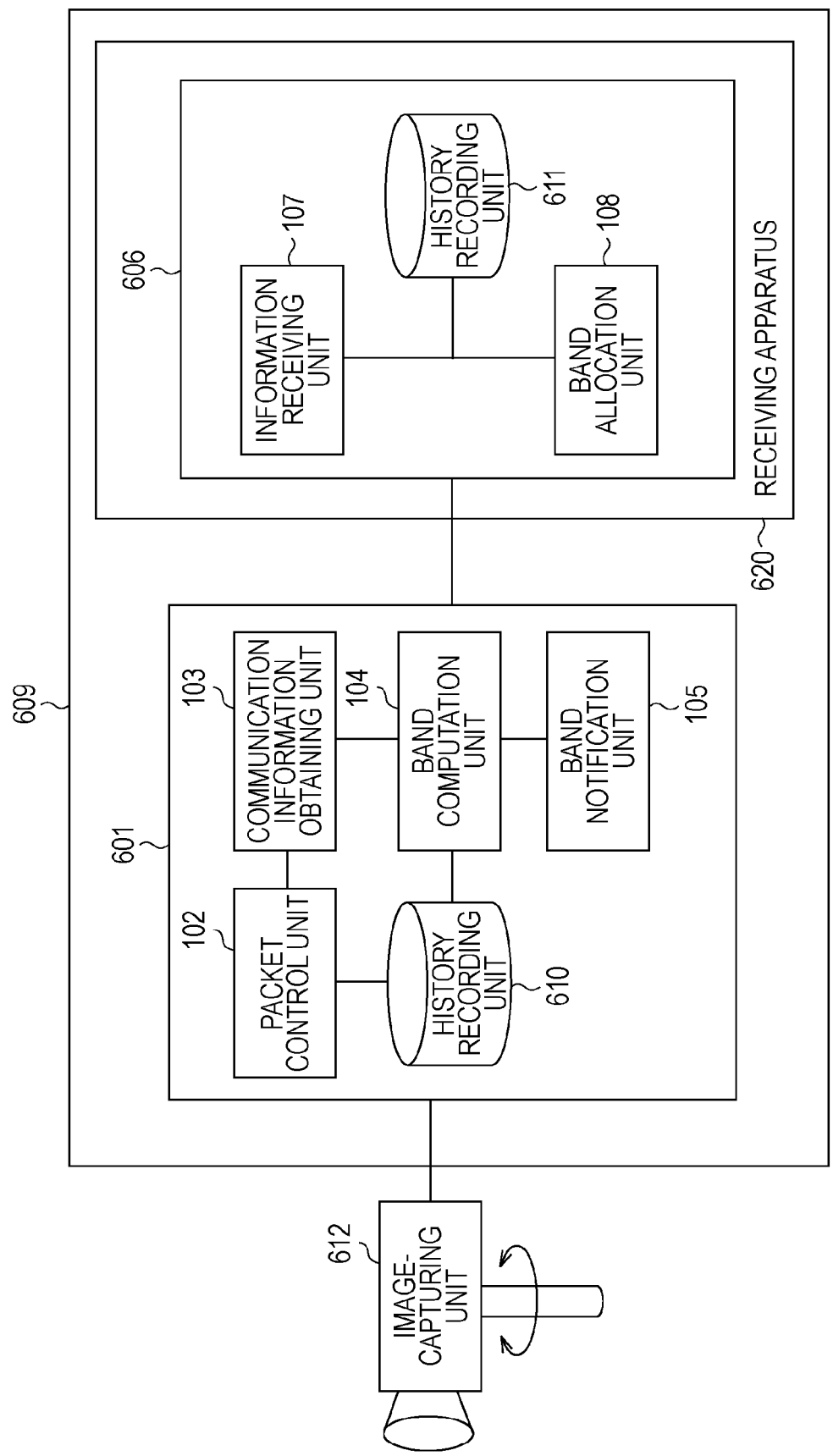
FIG. 6 is a block diagram showing an example of functions of a data processing system according to a third embodiment of the present invention.

FIG. 6 is a block diagram showing an example of functions of a data processing system in the present embodiment.

As shown in FIG. 6, a data processing system 609 includes a transmission apparatus 601 and a band control apparatus 606. The transmission apparatus 601 includes a packet control unit 102, a communication information obtaining unit 103, a band computation unit 104, a band notification unit 105, and a history recording unit 610. The band control apparatus 606 includes an information receiving unit 107, a band allocation unit 108, and a history recording unit 611. Furthermore, the band control apparatus 606 is configured as a part of a receiving apparatus 620 for requesting and receiving content.

In the present embodiment, real-time content (data) is transmitted from the image-capturing unit 612 to the transmission apparatus 601. The packet control unit 102, the communication state obtaining unit 103, the band computation unit 104, the band notification unit 105, the information receiving unit 107, and the band allocation unit 108, have the same functions as those of the first embodiment described with reference to FIG. 1, and accordingly, detailed descriptions thereof are omitted herein.

In the case of a storage file in the first and second embodiments, it is possible to obtain in advance information on transmission data. However, in a case where real-time data captured by an image-capturing unit 612 is to be streamed, it is difficult to know in advance what kind of data is to be sent. Accordingly, the transmission apparatus 601 has a history recording unit 610 for recording, when transmission data is sent, the communication data at that time as history information.

When there is a transmission history in the history recording unit 610, the transmission apparatus 601 computes whether data can be transmitted, and if so, how much the code amount is by referring to the transmission history. Then, information on the amount of code of the real-time data is sent to a coder (not shown). In the case where there is no transmission history in the history recording unit 610 (for example, in the case of data being sent from the image-capturing unit 612 for the first time), the transmission apparatus 601 holds a default amount of code in advance. Then, when the first data is sent, the real-time data is coded on the basis of the default value. Then, the communication information at this time is recorded in the history recording unit 610. Furthermore, the history recording unit 610 also holds a default value for a packet interval control method. Here, examples of default values for a packet interval control method include intervals of packets to be transmitted, a packet size, an intra-frame code amount, and a time period required to transmit all the packets. Regarding these default values, similarly to the default value of the code amount, an appropriate packet interval is computed on the basis of the transmission history, and the packet interval is determined.

If there is no transmission history, a packet interval is determined based on the value of the packet interval, which is set in advance in the history recording unit 610, and regarding the subsequent data, the packet interval is determined based on the transmission history.

In the present embodiment, an optimum transmission path band is computed by the transmission apparatus 601. Alternatively, as described in the second embodiment, the band control apparatus 606 may have a function of computing an optimum transmission path band. In this case, for example, as shown in FIG. 6, the band control apparatus 606 is provided with a history recording unit 611 for recording history information on a communication state, which is used to compute an optimum transmission path band. Here, the history information on the communication state includes history information on a communication state during transmission described above or history information on a communication state during reception. Then, when the optimum transmission path band is to be computed, the optimum transmission path band is computed based on the information held by the history recording unit 611.

When an optimum transmission path band is to be computed based on the information held by the history recording unit 611, as described above, in the case that there is no reception history, the packet interval, etc. are determined based on the default value of a packet interval, which is set in advance in the history recording unit 610. Then, regarding the subsequent data, the packet interval, etc. are determined based on the reception history, and the optimum transmission path band is computed.

In the case of real-time data for which an optimum transmission path band cannot be computed in advance by using communication information, the real-time data can be handled by using, as communication information, the threshold value of the code amount during coding and a transmission history, such as a packet interval. However, regarding streaming of real-time data, there is also a possibility that the amount of data may exceed the set optimum transmission path band. Therefore, in preparation for such a case, the band control apparatus 606 also has a function of dynamically changing the value of the optimum transmission path band.

In the manner described above, by dynamically changing the optimum transmission path band, it is possible to more easily deal with real-time data. Thereafter, when the data does not have an amount larger than that of the computed optimum transmission path band, transmission of packets is continued as is. When the data comes to have an amount larger than that of the optimum transmission path band in the current state, the optimum transmission path band is computed again in order to allocate the band. In the present embodiment, the transmission apparatus 601 holds a method of controlling packet intervals, the amount of code, and the default value for the transmission rate. In the case of data to be transmitted at first by the transmission apparatus 601, the held default value is handled as communication information. On the other hand, in the case of data to be transmitted at first by the transmission apparatus 601, history information on the communication state may be obtained from another transmission apparatus, and the obtained history information may be used.

For example, in a case where a plurality of transmission apparatuses exist and another transmission apparatus holds history information on the communication state, the transmission apparatus 601 obtains history information on the communication state appropriate for the communication state in the current state from the other transmission apparatus. Then, based on the information, communication information on the streaming data to be sent from now is determined. As a result, by computing an optimum transmission path band by using communication information based on actual transmission data, it is possible to more efficiently transmit real-time data.

As described above, in the present embodiment, for example, there is provided a unit for recording past communication information as history information on the communication state to be capable of dealing with streaming of real-time data captured by the image-capturing device. Then, the optimum transmission path band is computed by referring to the history information on the communication state. Furthermore, when a plurality of transmission apparatuses exist, by obtaining history information on the communication state from another transmission apparatus, even when data to be transmitted first is to be streamed, it is possible to compute an optimum transmission path band appropriate for the communication state. As a result, it is possible to decrease the packet loss ratio during streaming distribution regardless of a storage file or real-time data. Furthermore, by causing the code amount to have a default value based on a history, it is possible to realize streaming appropriate for the communication state.

Fourth Embodiment

In the above-described first and second embodiments, the data processing system formed by one transmission apparatus has been described. In the present embodiment, a description will be given, with reference to FIGS. 7 and 8, of a case in which streaming is performed by a data processing system constituted by a plurality of transmission apparatuses.

Figure 7:
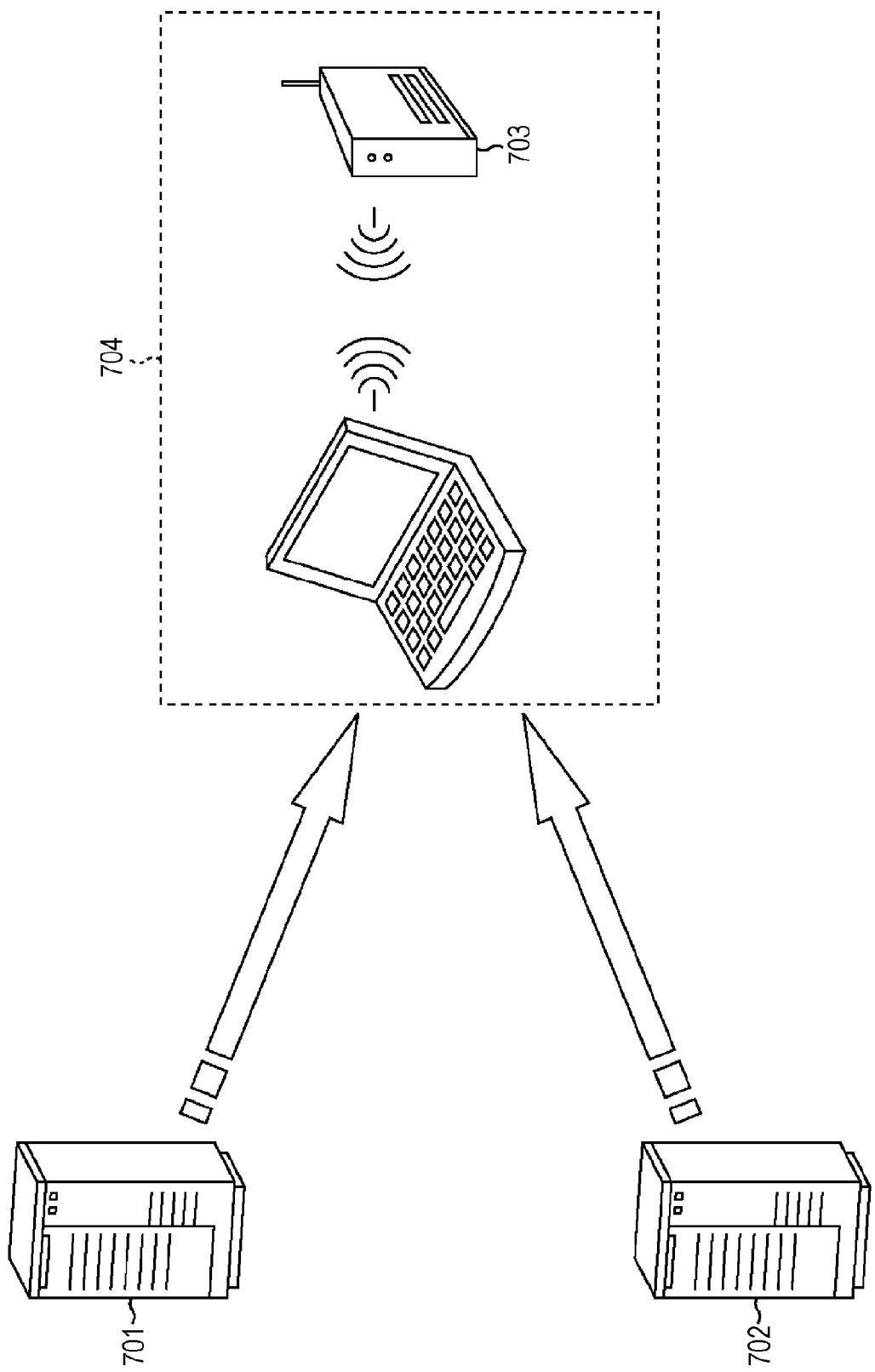
FIG. 7 shows an example of the overall configuration of a data processing system according to a fourth embodiment of the present invention.
Figure 8:
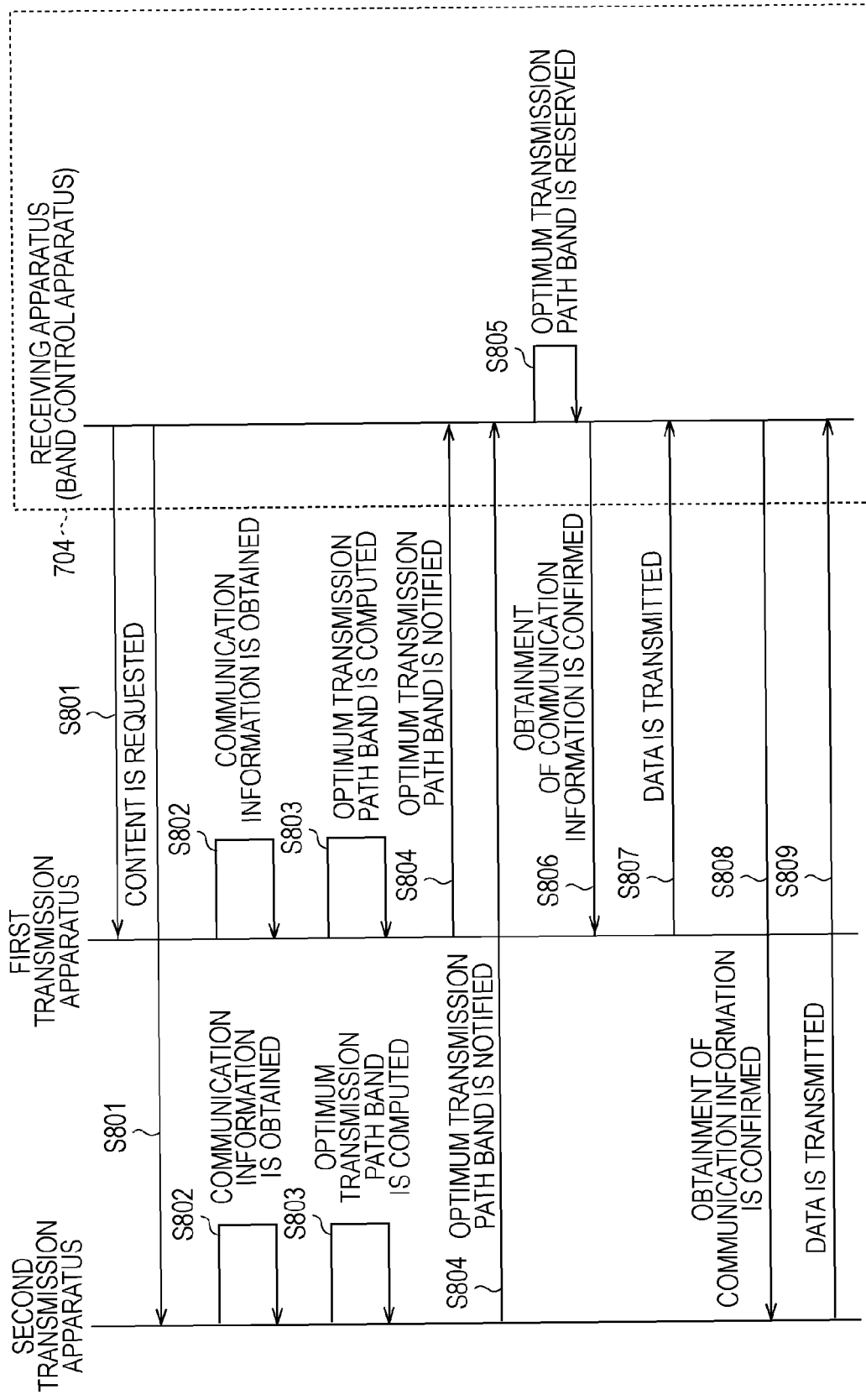
FIG. 8 is a timing chart showing an example of a processing procedure until packets are transmitted from a plurality of transmission apparatuses in the fourth embodiment of the present invention.

FIG. 7 shows a data processing system including a plurality of transmission apparatuses (a first transmission apparatus 701 and a second transmission apparatus 702) and a receiving apparatus 704 including a band control apparatus 703. The functions of the first transmission apparatus 701, the second transmission apparatus 702, and the band control apparatus 703 in this embodiment are identical to those of the first embodiment, and accordingly, detailed descriptions thereof are omitted herein. Furthermore, in the embodiment, the band control apparatus 703 is assumed to be included in the receiving apparatus 704 for requesting and receiving content. FIG. 8 is a timing chart showing an example of a processing procedure for transmitting packets from a plurality of transmission apparatuses in the present embodiment.

Initially, the first transmission apparatus 701 and the second transmission apparatus 702 receive a content request from the receiving apparatus 704 (step S801). At this time, when the receiving apparatus 704 makes a request for content, the request may be made via the band control apparatus 703 included in the receiving apparatus 704. Then, the first transmission apparatus 701 and the second transmission apparatus 702 obtain content to be distributed and communication information on the transmission state (step S802).

Next, the first transmission apparatus 701 and the second transmission apparatus 702 compute an optimum transmission path band based on the obtained communication information (step S803). Then, information on the computed optimum transmission path band is provided to the band control apparatus 703, which forms a part of the receiving apparatus 704 (step S804). The band control apparatus 703 receiving the information on the optimum transmission path band allocates the received optimum transmission path band (step S805).

Next, the information receiving unit 107 of the band control apparatus 703 notifies the first transmission apparatus 701 to which content is distributed first that the band could be allocated (step S806). Then, the first transmission apparatus 701 receiving the information starts transmitting data to the receiving apparatus 704 (step S807).

When the data transmission by the first transmission apparatus 701 is completed, the information receiving unit 107 of the band control apparatus 703 notifies the second transmission apparatus 702 to which data is transmitted next that the band could be allocated (step S808). The second transmission apparatus 702 receiving this report starts transmitting data to the receiving apparatus 704 (step S809).

In the present embodiment, the total time period of data sent by each transmission apparatus is included in the communication information. Furthermore, after the band control apparatus 703 receives information on the optimum transmission path band from the first transmission apparatus 701, the band control apparatus 703 receives information on an optimum transmission path band from the next second transmission apparatus 702. As a result, it is possible to smoothly shift to a procedure for allocating the optimum transmission path band.

As described above, in the present embodiment, when streaming playback is to be performed from a plurality of transmission apparatuses, an optimum transmission path band for each transmission apparatus is computed, and the optimum transmission path band is ensured in accordance with communication information. As a result, it is possible to allocate a transmission path band appropriate for individual data.

In the embodiment, the computation of the optimum transmission path band is performed on the transmission apparatus side. Alternatively, as described in the second embodiment, the computation of the optimum transmission path band may be performed by the band control apparatus. Although a case in which the number of transmission apparatuses is two has been described as an example, the present embodiment can be applied to a case in which one or more than two transmission apparatuses exist.

Other Embodiments

In the above-described first to fourth embodiments, an example in which the band control apparatus constitutes a part of the receiving apparatus has been described. In addition, the band control apparatus and the receiving apparatus may be configured independently of each other. In this case, the data processing system is formed of a transmission apparatus, a receiving apparatus, and a band control apparatus.

The above-described embodiments of the present invention can be attained by performing processing for supplying a storage medium on which program code of software implementing functions of the above-described embodiments is stored to a system or an apparatus and reading, with a computer (or a CPU or an microprocessor unit (MPU)) of the system or the apparatus, the program code stored on the storage medium. In this case, the program code itself read from the storage medium implements the functions of the above-described embodiments. That is, the computer-readable storage medium on which the program code is stored falls within the scope of the present invention.

As a storage medium for supplying the program code, for example, a floppy disk, a hard disk, an optical disc, a magneto-optical disc, a compact disc read-only memory (CD-ROM), a compact disc recordable (CD-R), a magnetic tape, a non-volatile memory card, a ROM, or a digital versatile disc (DVD) can be used.

In addition, a case where the functions of the above-described embodiments are attained when the computer executes the read program code also falls within the scope of the present invention. In addition, a case where the functions of the above-described embodiments are attained when part or all of actual processing is performed by an operating system (OS) or the like running on the computer on the basis of instructions of the program code also falls within the scope of the present invention.

In addition, a case where the functions of the above-described embodiments are attained by the processing described below also falls within the scope of the present invention. That is, a case where the functions of the above-described embodiments are attained when the program code read from the storage medium is written to a memory arranged in a function expansion board inserted into the computer or a function expansion unit connected to the computer and then the CPU or the like arranged in the function expansion board or the function expansion unit performs part or all of the actual processing on the basis of instructions of the program code also falls within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Application No. 2007-211455 filed Aug. 14, 2007, which is hereby incorporated by reference herein in its entirety.

What is claimed is:

1. A data processing system that packetizes content, transmits the packetized content, and allocates a transmission path band for transmitting the packetized content, the data processing system comprising:
   a packet interval control unit configured to control intervals at which packets of the packetized content are transmitted;
   an obtaining unit configured to obtain communication information indicating a communication state in which the intervals at which the packets are transmitted are controlled;
   a band computation unit configured to compute a transmission path band for transmitting the content based on the communication information; and
   a band allocation unit configured to allocate the computed transmission path band within a transmission path,
   wherein when the communication information includes a plurality of items, the band computation unit sets priorities for the plurality of items and computes the transmission path band based on the set priorities.

2. The data processing system according to claim 1, wherein the communication information contains information on the intervals at which the packets are to be transmitted, a size of packets, and a time period required to transmit the packets.

3. A data processing system comprising:
   a transmission apparatus configured to packetize content and transmit the packetized content; and
   a band control apparatus configured to allocate a transmission path band for transmitting the packetized content,
   wherein the transmission apparatus includes:

a packet interval control unit configured to control intervals at which packets of the packetized content are transmitted;

an obtaining unit configured to obtain communication information indicating a communication state in which the intervals at which the packets are transmitted are controlled;

a band computation unit configured to compute a transmission path band for transmitting the packetized content based on the communication information; and a band notification unit configured to provide the band control apparatus information on the computed transmission path band, wherein the band control apparatus includes:

a band receiving unit configured to receive information on the provided transmission path band; and a band allocation unit configured to allocate the transmission path band within a transmission path based on the information on the provided transmission path band.

4. The data processing system according to claim 3, wherein the transmission apparatus includes a history recording unit configured to hold, when the packetized content is packetized and transmitted, history information on a communication state at that time.

5. A data processing system comprising:

a transmission apparatus configured to packetize content and transmit the packetized content; and a band control apparatus configured to allocate a transmission path band for transmitting the packetized content, wherein the transmission apparatus includes:

a packet interval control unit configured to control intervals at which packets of the packetized content are transmitted;

an obtaining unit configured to obtain communication information indicating a communication state in which the intervals at which the packets are transmitted are controlled; and a band notification unit configured to provide the band control apparatus the communication information, and wherein the band control apparatus includes:

a band receiving unit configured to receive the communication information;

a band computation unit configured to compute a transmission path band for transmitting the packetized content based on the communication information; and a band allocation unit configured to allocate the computed transmission path band within a transmission path.

6. The data processing system according to claim 5, wherein the band control apparatus includes a history recording unit configured to hold, when the packetized content is packetized and transmitted, history information on a communication state at that time, or history information on a communication state during reception.

7. A transmission apparatus that packetizes content and transmits the packetized content, the transmission apparatus comprising:

a packet interval control unit configured to control intervals at which packets of the packetized content are transmitted;

an obtaining unit configured to obtain communication information indicating a communication state in which the intervals at which the packets are transmitted are controlled;

a band computation unit configured to compute a transmission path band for transmitting the packetized content based on the communication information; and a band notification unit configured to provide information on the computed transmission path band, wherein when the communication information includes a plurality of items, the band computation unit sets priorities for the plurality of items and computes the transmission path band based on the set priorities.

8. A band control apparatus that allocates a transmission path band for transmitting packetized content, the band control apparatus comprising:

an information receiving unit configured to receive communication information indicating a communication state in which intervals at which packets of the packetized content are transmitted are controlled;

a band computation unit configured to compute a transmission path band for transmitting the content based on the communication information; and a band allocation unit configured to allocate the computed transmission path band within a transmission path, wherein when the communication information includes a plurality of items, the band computation unit sets priorities for the plurality of items and computes the transmission path band based on the set priorities.

9. A method for packetizing content, transmitting the packetized content, and allocating a transmission path band for transmitting the packetized content, the method comprising:

controlling intervals at which packets of the packetized content are transmitted;

obtaining communication information indicating a communication state in which the intervals at which the packets are transmitted are controlled;

computing, using a processor, a transmission path band for transmitting the content based on the communication information; and allocating the computed transmission path band within a transmission path, wherein when the communication information includes a plurality of items, the computing step comprises setting priorities for the plurality of items and computing the transmission path band based on the set priorities.

10. A computer-readable storage medium storing computer-executable process steps, the computer-executable process steps causing a computer to execute the method of claim 9.

11. A method of controlling a data processing system in which a transmission apparatus packetizes content and transmits the packetized content, and a band control apparatus allocates a transmission path band for transmitting the packetized content, the method comprising:

a method of controlling the transmission apparatus, the method comprising:

controlling intervals at which packets of the packetized content are transmitted;

obtaining communication information indicating a communication state in which the intervals at which the packets are transmitted are controlled;

computing, using a processor, a transmission path band for transmitting the packetized content based on the communication information; and providing the band control apparatus information on the computed transmission path band; and a method of controlling the band control apparatus, the method comprising:
  receiving information on the provided transmission path band; and
  allocating the transmission path band within a transmission path based on the information on the transmission path band.

12. A method of controlling a data processing system in which a transmission apparatus packetizes content and transmits the packetized content via a transmission path, and a band control apparatus allocates a transmission path band for transmitting the packetized content, the method comprising:
  a method of controlling the transmission apparatus, the method comprising:
    controlling intervals at which packets of the packetized content are transmitted;
    obtaining communication information indicating a communication state in which the intervals at which the packets are transmitted are controlled; and
    providing the band control apparatus the communication information; and
  a method of controlling the band control apparatus, the method comprising:
    receiving the communication information;
    computing, using a processor, a transmission path band for transmitting the packetized content based on the communication information; and
    allocating the computed transmission path band within a transmission path.

13. A method of controlling a band control apparatus, the method comprising:
  receiving communication information indicating a communication state in which intervals at which packets of packetized content are transmitted are controlled;
  computing, using a processor, a transmission path band for transmitting the packetized content based on the communication information; and
  allocating the computed transmission path band within a transmission path,
  wherein when the communication information includes a plurality of items, the computing step comprises setting priorities for the plurality of items and computing the transmission path band based on the set priorities.

14. A computer-readable storage medium storing computer-executable process steps causing a computer to execute the method of claim 13.

* * * * *